(12) United States Patent
Gil Paredes

(10) Patent No.: US 9,581,471 B2
(45) Date of Patent: Feb. 28, 2017

(54) GAUGE WITH MULTIPLE COLOR POINTER TIP

(71) Applicant: Continental Automotive Systems, Inc., Auburn Hills, MI (US)

(72) Inventor: Victor Manuel Gil Paredes, Tlajomulco de Zúñiga (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 171 days.

(21) Appl. No.: 14/610,215

(22) Filed: Jan. 30, 2015

(65) Prior Publication Data

US 2016/0187169 A1    Jun. 30, 2016

Related U.S. Application Data

(60) Provisional application No. 62/097,870, filed on Dec. 30, 2014.

(51) Int. Cl.
*G01D 11/28* (2006.01)
*G01D 13/26* (2006.01)
*G01D 13/02* (2006.01)

(52) U.S. Cl.
CPC ............. *G01D 11/28* (2013.01); *G01D 13/02* (2013.01); *G01D 13/265* (2013.01)

(58) Field of Classification Search
CPC ........ G01D 11/28; G01D 13/00; G01D 13/02; G01D 13/04; G01D 13/26; G01D 13/265
USPC .............. 116/286, 287, 288, DIG. 5, DIG. 6, 116/DIG. 36; 340/441, 815.78; 362/23.12, 23.13, 23.19, 23.2, 23.21
See application file for complete search history.

(56) References Cited

U.S. PATENT DOCUMENTS

| 2,041,115 | A | * | 5/1936 | Clayton | ................... G04G 9/04 340/309.4 |
| 5,815,072 | A | * | 9/1998 | Yamanaka et al. | .... B60K 35/00 340/438 |
| 6,470,822 | B2 | * | 10/2002 | Adams et al. | ......... G01D 13/22 116/284 |
| 6,693,523 | B1 | | 2/2004 | Abel et al. | |
| 7,379,182 | B2 | * | 5/2008 | Han | ........................ G01D 11/28 356/364 |

(Continued)

FOREIGN PATENT DOCUMENTS

| DE | 2934531 A1 | * | 3/1981 | ............. G01D 11/28 |
| JP | 2005189156 A | * | 7/2005 | ............. G01D 11/28 |
| JP | DE 102014220880 A1 | * | 8/2015 | ............. G01D 11/28 |

*Primary Examiner* — R. A. Smith

(57) ABSTRACT

A gauge assembly having a pointer and gauge surface area with a scale representing operating parameters. The pointer has a first half and second half that are illuminated by light sources. The second half selectively changes color according to the portion of the scale that the pointer is indicating. This is accomplished by light isolation between the first and second halves as well as a prism to direct light from the midpoint of the pointer to the tip of the second half of the pointer. As the pointer moves about an axis, the prism for second half illumination aligns with respective chambers formed in a reflector to direct illumination from the different color lights. The second half color changes whenever the light source color under the prism is different. When the pointer is within predetermined ranges on the scale, the second half illumination changes color to represent that respective range.

24 Claims, 4 Drawing Sheets

(56) References Cited

U.S. PATENT DOCUMENTS

| | | | | |
|---|---|---|---|---|
| 7,724,129 B2* | 5/2010 | Altomonte | ............ | G01D 11/28 340/461 |
| 2008/0018488 A1* | 1/2008 | Struck et al. | .......... | B60K 35/00 340/815.86 |
| 2010/0083894 A1* | 4/2010 | Birman et al. | ......... | G01D 11/28 116/288 |
| 2016/0093405 A1* | 3/2016 | Birman et al. | ......... | G12B 11/04 116/288 |

* cited by examiner

GAUGE WITH MULTIPLE COLOR POINTER TIP

FIELD OF THE INVENTION

The present invention is related to vehicle gauge assemblies for instrument clusters providing color changing display as illuminated indicators of values.

BACKGROUND OF THE INVENTION

In the field of vehicle electronics and instrumentation, instrument clusters contain many different gauges indicating various desirable and undesirable vehicle conditions. Conventional instrument clusters often times include warning lights that are used to indicate when certain undesirable conditions exist, which can be seen on respective instrument gauges. For example, if a vehicle fuel gauge is within a certain low range, indicating that the vehicle's fuel tank is near empty, a low fuel indicator light is illuminated. This can be a re-fuel icon or other telltale for example. Another example is the fuel gauge having a red band portion located at a certain low range on the gauge scale, indicating that the vehicle's fuel tank is near empty, and a digital or rotatable pointer moving into the red band area indicates that the fuel level is low. Other warning lights, telltales, or the entire pointer changing to a color are also known. Yet another example includes indicator light source illumination when the vehicle's rotations per minute (RPMs) exceeds a predetermined desired range indicating high load conditions, elevated engine temperature, engine conditions, (ECO) driving, low tire pressure, low oil, and low battery warning lights/gauges that illuminate when predetermined undesirable conditions reach certain warning/alarm or cautionary ranges.

Some designs have a pointer typically provided that rotates about a fixed axis that points to value on the gauge face to communicate current values of an operational parameter. Pointers are often illuminated in a single color to further enhance visibility and appearance. Light sources direct light along the axis and the geometry of the pointer provides a means of propagating light from a hub to a pointer tip.

One problem with using these various warning lights is that an alarm condition is not easily recognized or noticed by an operator. An operator must also be able to decipher the symbol or what the light is indicating quickly, which is not always obvious from a quick glance at the instrument cluster. Another problem is the light sources and pointer can also cause a bright spot at the axis on the pointer.

It is therefore desirable to provide gauge assemblies for instrument clusters or other control units with innovative styling features and that increase light homogeneity and are easily recognizable and stand out to an operator by having a quick look at the instrument cluster. It is also desirable to provide gauge assemblies that provide the operator with cautionary indicators that a certain issue can be addressed prior to the issue or problem developing to a point where a heightened or severe warning indication is needed.

SUMMARY OF THE INVENTION

The present invention relates to a gauge assembly having a gauge surface area with zones representing a plurality of predetermined vehicle operating parameters. A pointer is provided which is made out of a light guide or light transmitting material. The pointer is supported for movement about an axis to indicate a current condition of the vehicle operating parameter by pointing to a specific location on the gauge surface. The pointer has a pointer arm extending away from a hub of the gauge assembly. The pointer arm has a first half and a second half, where the first and second halves are capable of different color display, and as the pointer moves about the axis, indicates condition of the predetermined vehicle operating parameters. The first half extends from the hub to about the midpoint on the pointer arm, while the second half generally extends from the midpoint to the tip of the pointer arm. The gauge assembly further includes a plurality of illumination sources for illuminating the first half and second half of the pointer, respectively. The pointer moves about the axis to locations on a scale dependent upon the vehicle operating conditions. Simultaneously, the second half of the pointer displays a color representative of each portion of the scale such that the second half corresponds to the specific location to which the pointer is pointing on the scale. Under predetermined conditions, the second half of the pointer selectively displays a different color than the first half, where the color change of the second half displays a representative color for each portion of the scale such that the second half corresponds to the specific location to which the pointer is located on the scale.

The pointer also includes a step portion formed around the midpoint of the pointer arm for light isolation between the first and second halves as well as a prism to direct light from the midpoint of the pointer to the tip of the second half of the pointer. The second half with the prism for tip illumination at least partially aligns with at least three chambers corresponding with predetermined locations on the scale to collect the different color light from the illumination sources associated with each respective chamber for illumination of the second half of the pointer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention provides a gauge assembly, e.g., an analog gauge assembly, having a pointer assembly and a gauge surface area with a corresponding scale representing a plurality of predetermined vehicle operating parameters. The pointer has a first half and second half that are selectively illuminated by a plurality of light sources. The second half changes color according to the portion of the scale that the pointer is indicating. This is accomplished by light isolation between the first and second halves as well as a prism to direct light from the midpoint of the pointer to the tip of the second half of the pointer. The second half changes color whenever the light source color adjacent the prism is different. As the pointer moves about an axis, the second half with the prism for second half illumination aligns with one of a plurality of chambers formed in a reflector portion to collect and reflect light emitting from a light source correlating to that chamber. When the pointer is within predetermined ranges on the scale, the second half illumination changes color to represent that respective range on the scale, while the first half does not change color. This serves to improve differentiation between zones on the scale at a glance, improve recognition of alarm conditions, improve homogeneity of the illumination since there are dedicated additional light sources to illuminate the second half itself, e.g., the tip which is typically the darkest zone on a pointer, and to ease anxiety in alarm situations, all of which are significant advantages over known designs employing warning lights, telltales, red bands on the scale, and pointers that change color in their entirety. In one embodiment, the backlight light sources corresponding to the plurality of chambers are illuminated simultaneously for constant illumination of the chambers, however, the backlight for the pointer tip correlates to the chamber with which the pointer tip is aligned (see FIG. 6) such that the pointer tip color will change whenever the light under the prism is different. Preferably, in accordance with another embodiment, the backlight light sources are turned on one chamber at a time such that only one of the plurality of chambers is providing backlighting for the pointer tip at any given time (see FIGS. 1, 5A-5C) when the pointer is over that chamber, which further helps differentiate the different scale zones when the gauge is indicating a certain value.

Figure 1:
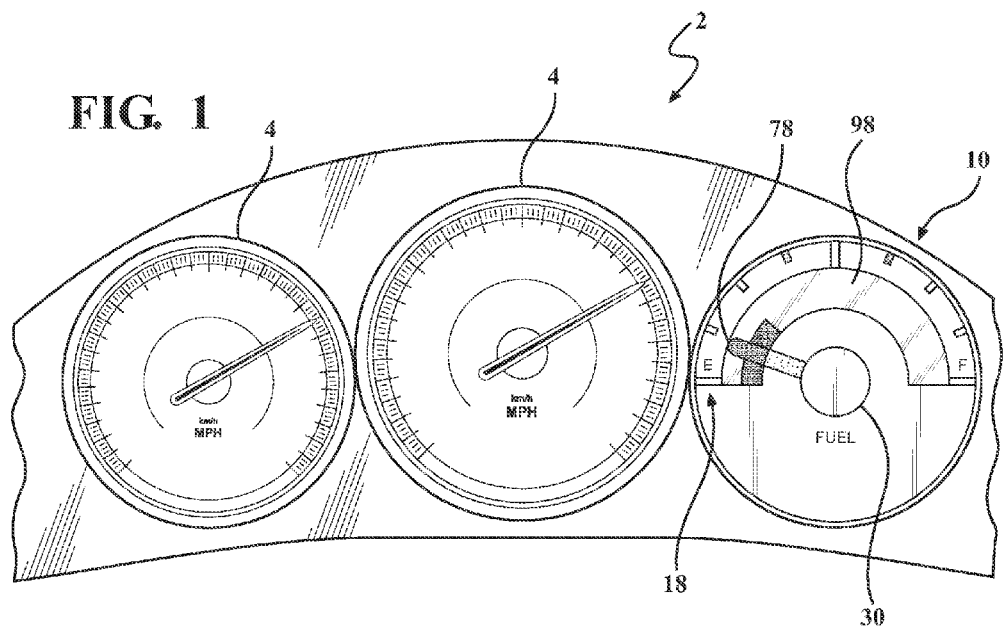
FIG. 1 is a partial front elevation view of a vehicle display assembly illustrating an environment of use of a vehicle instrument gauge assembly being part of a vehicle instrument cluster, in accordance with the present invention.

Referring now to the figures generally, with specific reference to FIG. 1, there is provided an instrument cluster shown generally at 2 for an instrument panel that includes at least one dial 4 and at least one gauge assembly shown generally at 10. These communicate information indicative of vehicle operating parameters to a vehicle operator. The gauge assembly 10 includes, a reflector portion shown generally at 12, dial portion shown generally at 14, and a pointer assembly shown generally at 16. The pointer assembly 16 is rotatable about an axis A-A (see FIG. 4) to selectively point to a specific portion of a scale, shown generally at 18, on the surface of the dial portion 14 to indicate a current value of an operating condition.

Figure 2:
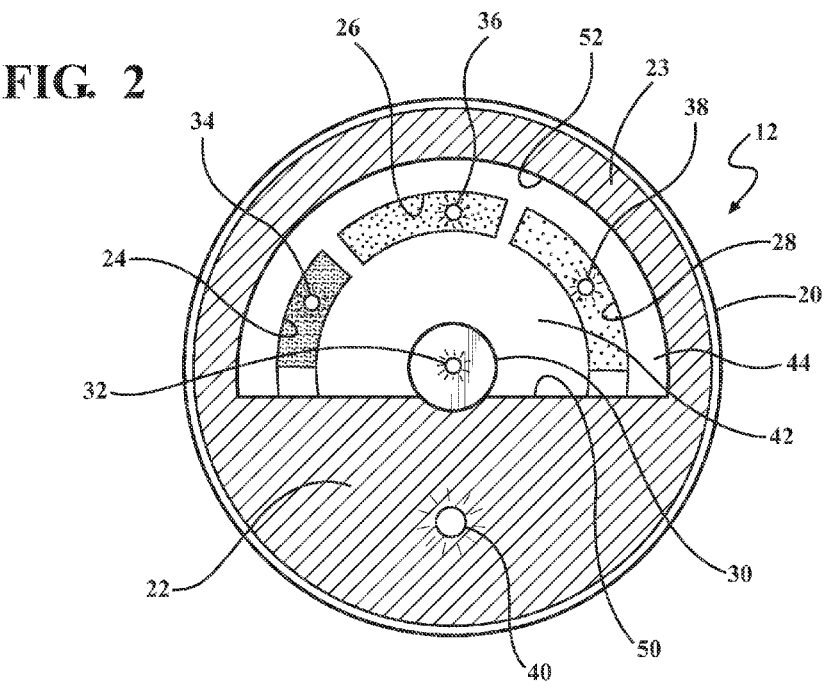
FIG. 2 is a broken-away front elevation view of the vehicle instrument gauge assembly showing a reflector portion, in accordance with the present invention.

Referring now to FIGS. 1-5 and 7 generally, and more particularly to FIG. 2, the gauge assembly 10 includes a housing 20 that supports the reflector portion 12. The reflector portion 12 has a reflector surface 22 and a plurality of chambers formed within the reflector portion 12 for multi-color pointer illumination. Preferably, there are at least three chambers spaced a predetermined distance from one another; a first chamber 24, a second chamber 26, and a third chamber 28. A hub portion 30 is centrally located in the gauge assembly 14 and operably coupled to the pointer assembly 16 for rotational movement of the pointer.

A first lighting source 32 generally located in the area of the hub 30 provides partial pointer assembly backlighting. A plurality of lighting sources provide illumination of each chamber. Most preferably, the first chamber 24 has a second lighting source 34, the second chamber 26 has a third lighting source 36 and the third chamber 28 has a fourth lighting source 38, where each of the second, third and fourth lighting sources 34,36,38 are a different color. At least one fifth lighting source 40 provides the general backlighting to the reflector surface 22. While the fifth lighting source 40 is illustrated adjacent the reflector surface 22, it is understood that alternative locations, such as at least one lighting source on the side of the housing 20, is contemplated.

There is further provided a first non-backlit surface area 42 of the reflector portion 12 that has no backlight and is located generally between the first, second and third chambers 24,26,36 and the hub 30. There is a second surface area 44 of the reflector portion 12 that is not backlit by the fifth lighting source 40 and is located radially outward from the chambers 24,26,36, generally between the first, second and third chambers 24,26,36 and an outward strip 23 of reflector surface 22. The reflector surface 22, including the outward strip 23, is formed of suitable material and configured for general backlighting viewable on the dial portion 14. By way of non-limiting example, a panel is used to block illumination to the first non-backlit surface area 42. More preferably, there is provided at least a first and second lower depending wall 50,52 formed in the reflector portion 12 to block general backlighting such as emitted from the fifth lighting source 40. Other light sources 40 may optionally be provided on and/or adjacent the reflector 12 if desired for a particular application as will be appreciated by those skilled in the art. Most preferably, general backlighting is provided to the reflector surface 22 by at least one side mounted light emitting diode (LED) on the housing 20. Other light sources are known by those skilled in the art and are also contemplated in the present invention.

The plurality of chambers 24,26,28 or segments provide an array of illuminated segments for a predetermined range on the scale. The third chamber 28 has luminescence of a first color, e.g., white or green, representing a normal or acceptable range, the second chamber 26 has luminescence of a second color, e.g., yellow or amber, representing a warning or cautionary range, and the first chamber 24 has luminescence of a third color, e.g., red, representing an alarm or hazardous range. Other chambers or segments may optionally be provided if desired for a particular application as will be appreciated by those skilled in the art. FIG. 2 illustrates three chambers and levels of luminescence, however, more or less are within the contemplation of the present invention. It is further contemplated that the plurality of chambers can be alternatively arranged in a column, row, and/or radially, and combinations thereof.

Figure 3:
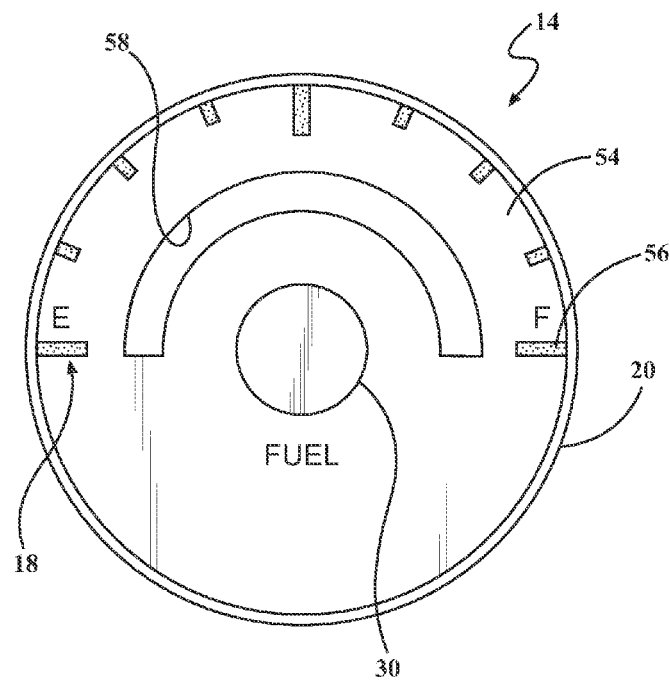
FIG. 3 is a broken-away front elevation view of the vehicle instrument gauge assembly showing a gauge portion, in accordance with the present invention.

Referring to FIGS. 1-5 and 7 generally, and more particularly to FIG. 3, The housing 20 also supports a dial surface 54 with graphics 56 of the dial portion 14. The dial portion 14 is operable coupled adjacent to the reflector portion 12, e.g., in the illumination path, and has a cutout 58 operably shaped and positioned over the plurality of chambers suitable to allow light from the chambers 24,26,28 to go directly to the pointer tip prism.

Figure 7:
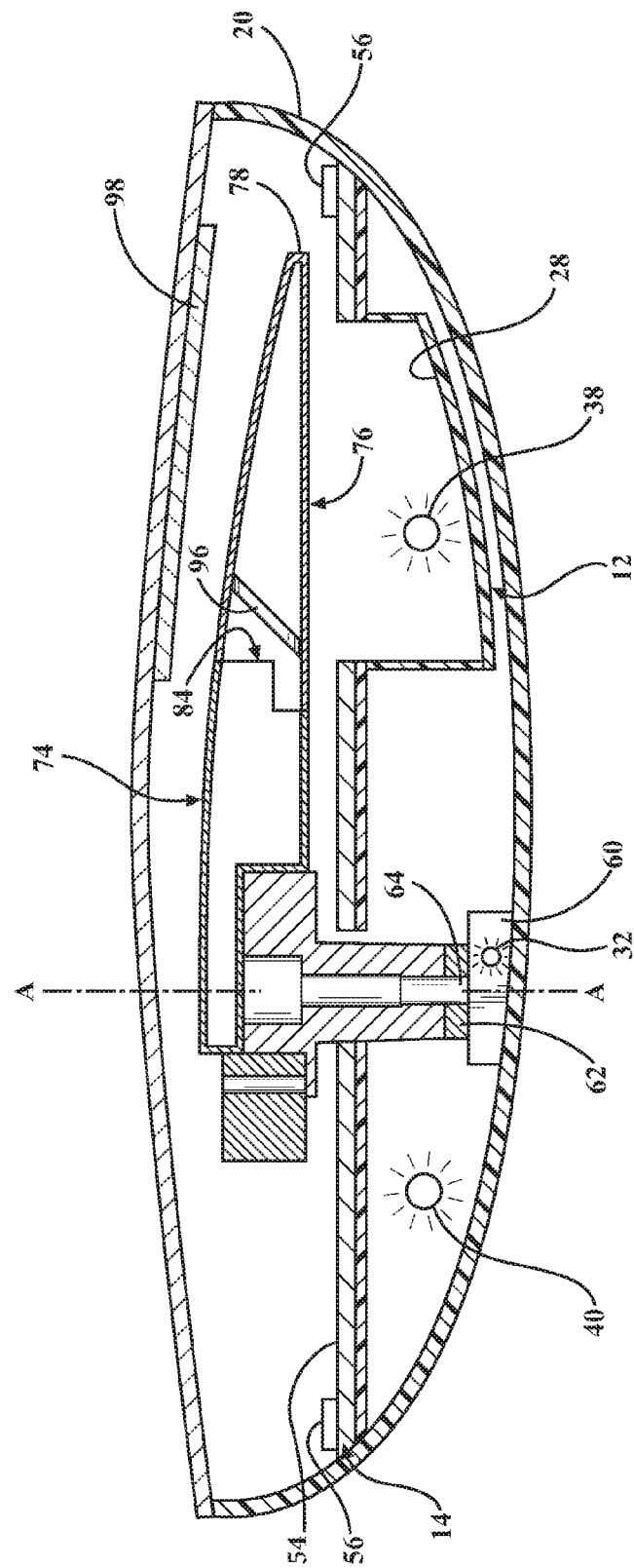
FIG. 7 is a cross-section of an exemplary gauge assembly with a pointer assembly.

Referring now to FIGS. 1-5 and 7 generally, and more particularly to FIG. 7, The housing 20 also supports a printed circuit board 60. The printed circuit board 60 supports a stepper motor 62 that drives a shaft 64. The shaft 64 may be a clear shaft or a shaft including a central opening through which light propagates upwardly into the pointer assembly 16. The first light source 32 is supported on the printed circuit board 60 along an axis A-A. The first light source 32 propagates light upward into the pointer assembly 16 along the axis A-A. Most preferably, the first light source 32 is disposed adjacent the axis A-A within a light housing 66 to direct light upward into the pointer assembly 16. Alternatively, the first light source 32 is disposed along the axis A-A directing light upward along axis A-A.

Figure 4:
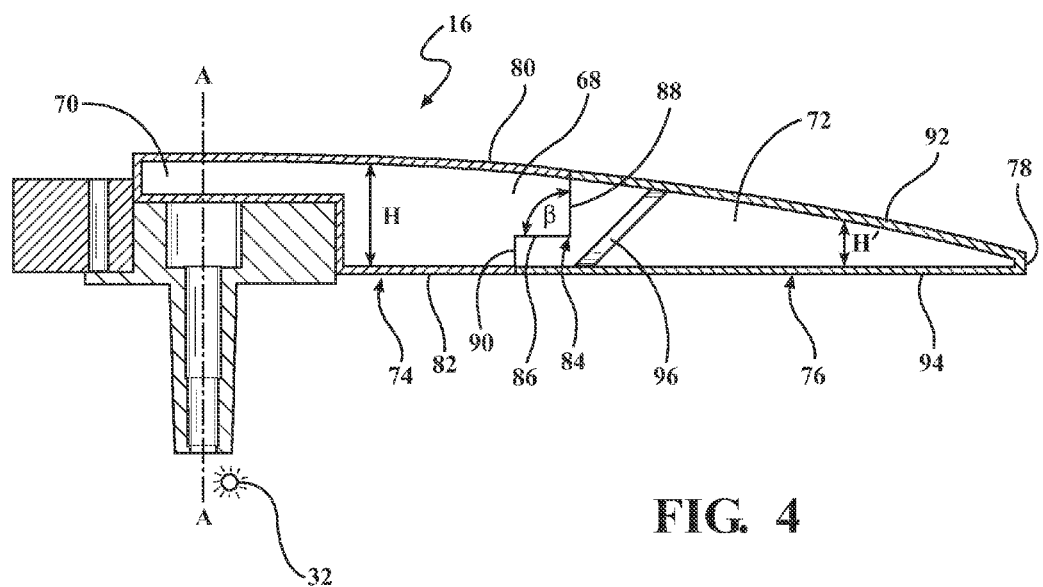
FIG. 4 is a side elevation view of a pointer assembly of the vehicle instrument gauge assembly, in accordance with the present invention.

Referring to the Figures generally, and more particularly to FIG. 4, the pointer assembly 16 includes a pointer 68 or pointer arm with a base 70 disposed about the axis A-A and a pointer arm 72. The pointer arm 72 has a first half, generally shown at 74, and a second half, generally shown at 76. Light from the first light source 32 is propagated upward into the first half 74. The first half 74 extends from the hub 30 of the gauge assembly 10 to about the midpoint on the pointer arm 72, while the second half 76 generally extends from the midpoint to the tip 78 of the pointer arm 72.

The first half 74 includes a first top surface 80 and a first bottom surface 82, where the first top surface 80 receives light from the first light source 32 substantially along the length of the first half 74 only. The first light source 32 provides a fixed color, e.g., white, for the first half 74 regardless of operating parameters or where the pointer arm 72 is located on the scale 18. Thus, there is provided by the first light source 32 first illumination of the pointer 68 that is a fixed color for the first half 74.

The pointer arm 72 has a light isolation portion generally shown at 84 located generally at the midpoint of the pointer arm 72. The light isolation portion 84 is formed by step portion surfaces formed by the first and second halves 74,76 where the halves 74,76 meet to prevent illumination from the first light source 32 from entering the second half 76 through way of the first half 74, and vice versa. The light isolation portion 84 has a first step surface 86 located substantially normal to an axis of rotation A-A of the pointer 68 and a second angled surface 88 at an angle "B" of about 90 degrees to the first surface 86. A third angled surface 90 is at an angle of about 90 degrees to the first surface 86. The light isolation portion 84 is formed across the height and width of the pointer arm 72 near the midpoint of the pointer arm 72 such that the pointer fixed color from the first light source 32 provides the first illumination to the first half 74 only.

The second half 76 includes a second top surface 92 and a second bottom surface 94, where the second top surface 92 selectively receives light from the second, third, and fourth light sources 34,36,38. There is also provided a prism 96 at an operable angle for directing light from the midpoint of the pointer arm 72 through the second half 76 all the way to the tip 78. The second half 76 is also pad printed or stamped in white only on the bottom surface 94.

The second half 94 selectively changes color according to the portion of the scale that the pointer 68 is indicating. This is accomplished by light isolation provided by the light isolation portion 84 between the first and second halves 74,76 as well as the prism 96 to direct light from the midpoint of the pointer 68 to the tip 78 of the second half 76 of the pointer 68. As the pointer moves about the axis of rotation (A-A), the prism 96 for second half 76 illumination aligns with one of the plurality of chambers 24,26,28 formed in a reflector portion 12 to direct illumination from the different light sources 34,36,38, respectively. The second half 76 color changes whenever the light source color under the prism 96 is different. When the pointer 68 is within predetermined ranges on the scale, the second half 76 illumination changes color to represent that respective range.

The pointer arm 72 is also tapered along the first and second top surfaces 80,92 from the base 70 to the tip 78. In particular, the first half 74 includes a larger height "H" near the base 70 and tapers to a smaller height "H" near the tip 78.

Referring to FIGS. 1-5 and 7 generally, and more particularly to FIGS. 1 and 5A-5C, the gauge assembly 10 further includes a light diffuser panel 98 having a predetermined width and being operably coupled above the second half 76 of the pointer 68 for diffusing light. The light diffuser panel 98 is a tinted textured acrylic that functions as a light diffuser for the light coming from the pointer tip illumination, in particular, for the illumination coming from the second half 76 of the pointer 68. Optionally, the light diffuser panel 98 is sized to a predetermined width to hide the detail of the light isolation from the hub 30 to the second half 76 backlights as well.

Figure 5A:
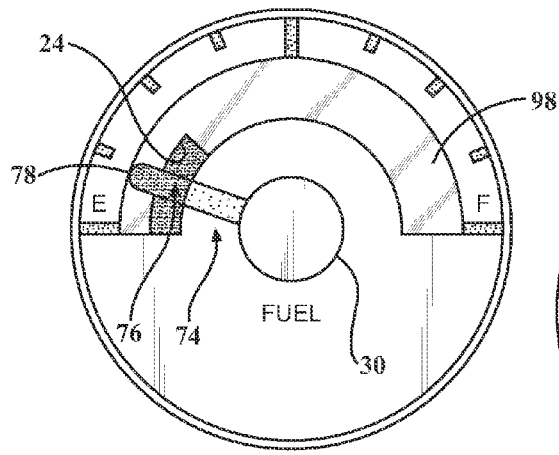
FIG. 5A is a front elevation view of the vehicle instrument gauge assembly illustrating an exemplary first chamber and pointer illumination when predetermined undesirable conditions exist, in accordance with the present invention.
Figure 5B:
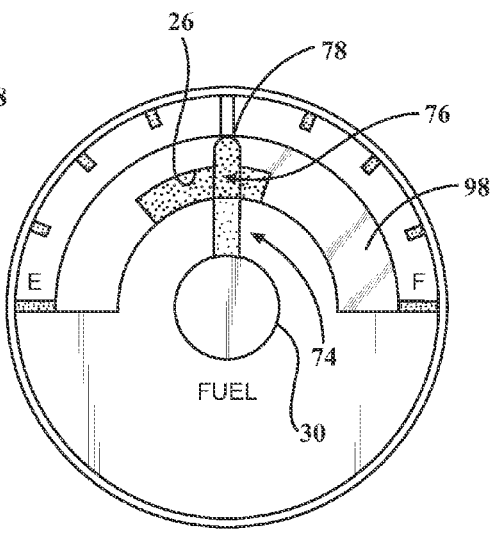
FIG. 5B is a front elevation view of the vehicle instrument gauge assembly illustrating an exemplary an exemplary second chamber and pointer illumination when predetermined cautionary conditions exist, in accordance with the present invention.
Figure 5C:
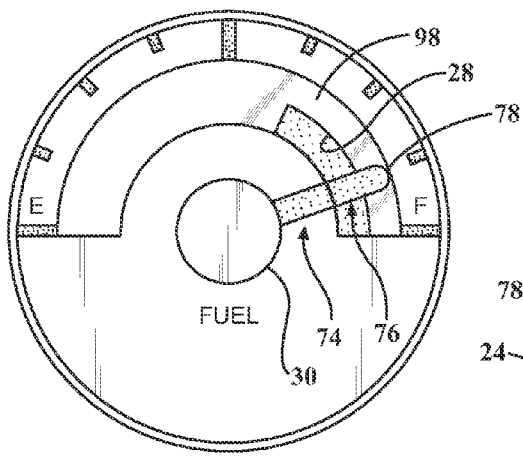
FIG. 5C is a front elevation view of the vehicle instrument gauge assembly illustrating an exemplary an exemplary third chamber and pointer illumination when predetermined desirable conditions exist, in accordance with the present invention.

Preferably, the backlight light sources 34,36,38 of the chambers are selectively turned on one chamber at a time such that only one of the plurality of chambers 24,26,28 is providing backlighting for the pointer tip half 76 at any given time (see FIGS. 1, 5A-5C) when the pointer 68 is over that chamber. Specifically, referring to FIG. 5A for illustration, when the second half 76 of the pointer 68 is over the first chamber 24 the second half 76 is illuminated from the midpoint of the pointer to the tip 78 by the second light source 34 in a first color that is different from the backlit color of the first half 74 of the pointer 68 from the first light source 32. Referring to FIG. 5B for illustration, as the pointer 68 selectively moves to another location on the scale, the second light source 34 corresponding to the first chamber 24 turns off and the third light source 36 corresponding to the second chamber 26 turns on to illuminate the second half 76 of the pointer 68 in a second color, which second color is different than the first half 74 illumination. Referring to FIG. 5C for illustration, as the pointer 68 selectively moves to yet another location on the scale, the third light source 36 corresponding to the second chamber 26 turns off and the fourth light source 38 corresponding to the third chamber 28 simultaneously turns on to illuminate the second half 76 of the pointer 68 in a third color, which third color is preferably the same as the first half 74 illumination.

Figure 6:
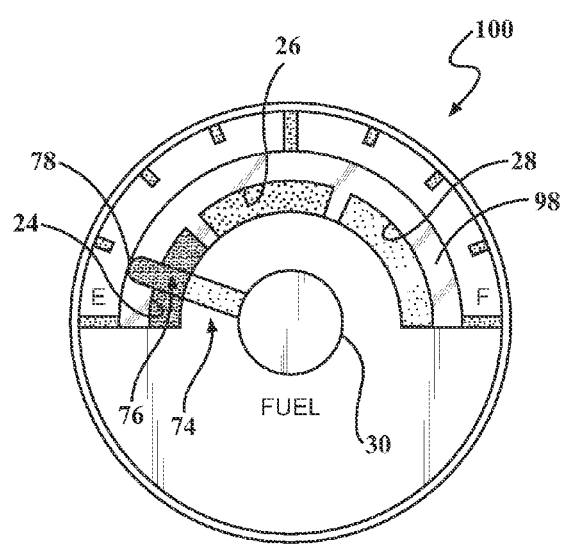
FIG. 6 is a front elevation view of a vehicle instrument gauge assembly illustrating simultaneous multi-chamber and pointer illumination when predetermined conditions exist, in accordance with a second embodiment of the present invention.

Referring to FIG. 6, in accordance with another embodiment, there is provided a gauge assembly generally at 100 where like numbers indicate like features of FIGS. 1-5 and 7. The backlight light sources 34,36,38 corresponding to the plurality of chambers 24,26,28 are illuminated simultaneously for constant illumination of the plurality of chambers, however, the backlight for the second half 76 correlates to the respective chamber 24,26 or 28 with which the second half 76 is aligned (see FIG. 6) such that the second half 76 color will change whenever the light under the prism 96 is different.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A gauge assembly, comprising:
   a reflector portion having a plurality of chambers representing a predetermined range of a vehicle operating parameter, each chamber having one of a plurality of light sources;
   a dial portion having a gauge surface including graphics on the gauge surface representing the vehicle operating parameter, said dial portion positioned above said reflector portion;
   a pointer assembly supported for movement about an axis to indicate a current condition of the vehicle operating parameter by pointing to a specific location on the gauge surface, said pointer assembly including a pointer arm extending away from a hub;
   a fifth light source for backlight illumination of said reflector portion;
   a first light source for illuminating a first half of said pointer arm, said first half extending away from said hub to a midpoint of said pointer arm;
   a prism located in a second half of said pointer arm, said second half extending away from said midpoint to a tip of said pointer arm, wherein said prism is at a predetermined angle to reflect light from a respective one of said plurality of light sources when said second half of said pointer arm is positioned above a respective one of said plurality of chambers; and
   a light isolation portion having one or more steps formed through the pointer arm, wherein the one or more steps prevents light received by said first half from entering said second half of said pointer arm and prevents light received by said second half from entering said first half of said pointer arm.

2. The gauge assembly of claim 1, further comprising a cutout on said dial portion positioned above said plurality of chambers to allow light from said plurality of chambers to go directly to the second half of said pointer arm when said second half of said pointer arm is positioned above a respective one of said plurality of chambers.

3. The gauge assembly of claim 1, wherein said plurality of chambers comprises at least three chambers and said plurality of light sources each emit a different color.

4. The gauge assembly of claim 1, further comprising a light diffuser panel positioned at least above the second half of the pointer arm to diffuse light from the second half illumination, wherein said light diffuser panel is formed of a tinted textured acrylic.

5. The gauge assembly of claim 1, wherein said first half of said pointer arm is backlit by said first light source of a first color, and said second half of said pointer arm is selectively backlit by said plurality of light sources, wherein at least one of said plurality of light sources emits a different color than said first light source.

6. The gauge assembly of claim 1, further comprising a control unit for simultaneous illumination of more than one of the plurality of chambers and additionally simultaneous illumination of the second half of the pointer arm when said second half of said pointer arm is positioned above a respective one of said plurality of chambers.

7. The gauge assembly of claim 1, further comprising a control unit for turning said plurality of light sources on/off, such that when said second half of said pointer arm is positioned above a respective one of said plurality of chambers, the respective one of said plurality of light sources associated with said chamber is turned on and the second half of the pointer arm is illuminated by the same light source.

8. The gauge assembly of claim 1, wherein said pointer arm further includes a first top surface and second top surface which are illuminating viewing surfaces to which light from said first light source and each of said plurality of light sources is received, respectively.

9. The gauge assembly of claim 8, wherein the first top surface and/or second top surface tapers at an angle of less than 90 degrees toward a plane normal to the axis in the direction toward a tip of said pointer arm spaced apart from the hub.

10. The gauge assembly of claim 9, wherein the pointer arm includes a first height proximate the step portion and tapers to a second height less than the first height in a direction toward the tip.

11. The gauge assembly of claim 1, wherein when said pointer arm is positioned above at least one of said graphics on said gauge surface the second half of said pointer arm with the prism for second half illumination aligns with one of said plurality of chambers formed in said reflector portion to collect and reflect light emitting from said light source correlating to that chamber when said pointer arm is within predetermined ranges on a scale, and said second half illumination changes color to represent that respective range on said scale, while the first half does not change color.

12. The gauge assembly of claim 1, wherein illumination of the entire pointer arm is provided by at least two different light sources.

13. The gauge assembly of claim 12, wherein illumination of the first half of said pointer arm is provided by a different light source than illumination of the second half of the pointer arm.

14. A gauge assembly, comprising:
   a reflector portion having a plurality of chambers representing a predetermined range of a vehicle operating parameter, each chamber having one of a plurality of light sources;
   a dial portion having a gauge surface including graphics on the gauge surface representing the vehicle operating parameter, said dial portion positioned above said reflector portion;
   a pointer assembly supported for movement about an axis to indicate a current condition of the vehicle operating parameter by pointing to a specific location on the gauge surface, said pointer assembly including a pointer arm extending away from a hub;
   a fifth light source for backlight illumination of said reflector portion;
   a first light source for illuminating a first half of said pointer arm, said first half extending away from said hub to a midpoint of said pointer arm;

a prism located in a second half of said pointer arm, said second half extending away from said midpoint to a tip of said pointer arm, wherein said prism is at a predetermined angle to reflect light from a respective one of said plurality of light sources when said second half of said pointer arm is positioned above a respective one of said plurality of chambers; and a light isolation portion having one or more steps formed through the pointer arm, wherein the one or more steps prevents light received by said first half from entering said second half of said pointer arm and prevents light received by said second half from entering said first half of said pointer arm;

wherein said one or more raised steps includes a first step surface which is substantially normal to an axis of rotation of said pointer assembly, a second angled surface at an angle of about 90 degrees to said first step surface, and a third angled surface is at an angle of about 90 degrees to said first step surface, wherein said one or more raised steps blocks at least a portion of the light to said first and second halves of said pointer arm from the other of said first and second half.

15. The gauge assembly of claim 14, further comprising a cutout on said dial portion positioned above said plurality of chambers to allow light from said plurality of chambers to go directly to the second half of said pointer arm when said second half of said pointer arm is positioned above a respective one of said plurality of chambers.

16. The gauge assembly of claim 14, wherein said plurality of chambers comprises at least three chambers and said plurality of light sources each emit a different color.

17. The gauge assembly of claim 14, further comprising a light diffuser panel positioned at least above the second half of the pointer arm to diffuse light from the second half illumination, wherein said light diffuser panel is formed of a tinted textured acrylic.

18. The gauge assembly of claim 14, wherein said first half of said pointer arm is backlit by said first light source of a first color, and said second half of said pointer arm is selectively backlit by said plurality of light sources, wherein one or more of said plurality of light sources emits a different color than said first light source.

19. The gauge assembly of claim 14, further comprising a control unit for turning said plurality of light sources on/off, such that when said second half of said pointer arm is positioned above a respective one of said plurality of chambers, the respective one of said plurality of light sources associated with said chamber is turned on and the second half of the pointer arm is illuminated by the same light source.

20. The gauge assembly of claim 14, wherein said pointer arm further includes a first top surface and second top surface which are illuminating viewing surfaces to which light from said second light source and each of said plurality of light sources is received, respectively.

21. The gauge assembly of claim 14, wherein the pointer arm includes a first height proximate the step portion and tapers to a second height less than the first height in a direction toward the tip.

22. The gauge assembly of claim 14, wherein when said pointer arm is positioned above at least one of said graphics on said gauge surface the second half of said pointer arm with the prism for second half illumination aligns with one of said plurality of chambers formed in said reflector portion to collect and reflect light emitting from said light source correlating to that chamber when said pointer arm is within predetermined ranges on a scale, and said second half illumination changes color to represent that respective range on said scale, while the first half does not change color.

23. The gauge assembly of claim 14, wherein illumination of the first half of said pointer arm is provided by a different light source than illumination of the second half of the pointer arm.

24. A gauge assembly, comprising:
a reflector portion having at least a first chamber, second chamber, and third chamber representing a predetermined range of a vehicle operating parameter, respectively;
a second light source located in said first chamber;
a third light source located in said second chamber;
a fourth light source located in said third chamber, wherein each light source is a different color;
a dial portion having a gauge surface including graphics on the gauge surface representing the vehicle operating parameter, said dial portion positioned above said reflector portion;
a pointer assembly supported for movement about an axis to indicate a current condition of the vehicle operating parameter by pointing to a specific location on the gauge surface, said pointer assembly including a pointer arm extending away from a hub, said pointer arm including a first half and a second half, said first half extending away from said hub to a midpoint of said pointer arm and illuminated by said first light source, said second half extending away from said midpoint of said pointer arm to a tip of said pointer arm and selectively illuminated by said second, third, and fourth light sources;
a fifth light source for backlight illumination of said reflector portion;
a prism located in said second half of said pointer arm at a predetermined angle to reflect light from a respective one of said second, third, and fourth light sources when said second half of said pointer arm is positioned above a respective one of said first, second and third chambers; and
a light isolation portion having one or more steps formed through the pointer arm, wherein the one or more steps prevents light received by said first half from entering said second half of said pointer arm and prevents light received by said second half from entering said first half of said pointer arm.

* * * * *